United States Patent
Kim et al.

(10) Patent No.: US 12,294,115 B2
(45) Date of Patent: *May 6, 2025

(54) BATTERY MODULE, AND BATTERY PACK AND VEHICLE COMPRISING BATTERY MODULE

(71) Applicant: LG Energy Solution, Ltd., Seoul (KR)

(72) Inventors: Kyung-Mo Kim, Daejeon (KR); Ho-June Chi, Daejeon (KR); Jeong-O Mun, Daejeon (KR); Jin-Yong Park, Daejeon (KR); Jung-Hoon Lee, Daejeon (KR); Hee-Jun Jin, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 460 days.

This patent is subject to a terminal disclaimer.

(21) Appl. No.: 17/768,982

(22) PCT Filed: Sep. 22, 2020

(86) PCT No.: PCT/KR2020/012796
§ 371 (c)(1),
(2) Date: Apr. 14, 2022

(87) PCT Pub. No.: WO2021/080192
PCT Pub. Date: Apr. 29, 2021

(65) Prior Publication Data
US 2023/0143366 A1  May 11, 2023

(30) Foreign Application Priority Data

Oct. 24, 2019 (KR) .................... 10-2019-0132947

(51) Int. Cl.
*H01M 50/503* (2021.01)
*H01M 50/209* (2021.01)
(Continued)

(52) U.S. Cl.
CPC ....... *H01M 50/503* (2021.01); *H01M 50/209* (2021.01); *H01M 50/211* (2021.01); *H01M 50/557* (2021.01)

(58) Field of Classification Search
CPC ............. H01M 50/207; H01M 50/209; H01M 50/211; H01M 50/503; H01M 50/507; H01M 50/552; H01M 50/557
See application file for complete search history.

(56) References Cited

U.S. PATENT DOCUMENTS 10,608,227 B2 *  3/2020  Okamoto .......... H01M 10/0585
11,158,912 B2 * 10/2021  Chi ....................... H01R 4/4846
(Continued)

FOREIGN PATENT DOCUMENTS

CN       208955084 U     6/2019
EP          3719899 B1    8/2021
(Continued)

OTHER PUBLICATIONS

International Search Report for Application No. PCT/KR2020/012796 mailed Dec. 24, 2020, 2 pages.

*Primary Examiner* — Kevin E Yoon
(74) *Attorney, Agent, or Firm* — Lerner David LLP

(57) ABSTRACT

Disclosed is a battery module, which includes a plurality of battery cells having electrode leads protruding thereon, and a bus bar assembly for electrically connecting the electrode leads of the plurality of battery cells. The bus bar assembly includes a bus bar frame, a plurality of lead slots defined by the bus bar frame so that the electrode leads pass therethrough, at least one sensing bus bar disposed between the plurality of lead slots and connected to the electrode leads, and an elastic guider disposed at the rear of the at least one sensing bus bar in a front and rear direction of the bus bar frame.

10 Claims, 10 Drawing Sheets

(51) Int. Cl.
*H01M 50/211* (2021.01)
*H01M 50/557* (2021.01)

(56) References Cited

U.S. PATENT DOCUMENTS

| | | |
|---|---|---|
| 2020/0020915 A1 | 1/2020 | Chi et al. |
| 2020/0067066 A1 | 2/2020 | Kim et al. |
| 2020/0076025 A1 | 3/2020 | Jo et al. |
| 2020/0203698 A1 | 6/2020 | Jin et al. |
| 2020/0350547 A1 | 11/2020 | Chi et al. |
| 2021/0043908 A1 | 2/2021 | Nagafuchi et al. |
| 2021/0367259 A1 | 11/2021 | Yaginuma et al. |

FOREIGN PATENT DOCUMENTS

| | | | |
|---|---|---|---|
| JP | 2004362996 A | | 12/2004 |
| JP | 2009022977 A | | 2/2009 |
| JP | 2012038558 A | | 2/2012 |
| JP | 2013206844 A | | 10/2013 |
| JP | 2016004611 A | | 1/2016 |
| JP | 2020518968 A | | 6/2020 |
| KR | 1020140093424 A | * | 7/2014 |
| KR | 20180119372 A | | 11/2018 |
| KR | 20190040402 A | | 4/2019 |
| KR | 20190040759 A | | 4/2019 |
| KR | 20190056013 A | | 5/2019 |
| KR | 20190060376 A | | 6/2019 |
| KR | 20190064887 A | | 6/2019 |
| WO | 2019106765 A1 | | 6/2019 |
| WO | 2019176584 A1 | | 9/2019 |

* cited by examiner

BATTERY MODULE, AND BATTERY PACK AND VEHICLE COMPRISING BATTERY MODULE

CROSS REFERENCE TO RELATED APPLICATIONS

The present application is a national phase entry under 35 U.S.C. § 371 of International Application No. PCT/KR2020/012796 filed on Sep. 22, 2020, which claims priority from Korean Patent Application No. 10-2019-0132947 filed on Oct. 24, 2019 in the Republic of Korea, the disclosures of which are incorporated herein by reference.

TECHNICAL FIELD

The present disclosure relates to a battery module, and a battery pack and a vehicle including the battery module.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attention as a new energy source for enhancing environment friendliness and energy efficiency in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may vary according to the required output voltage or the required charge/discharge capacity.

Meanwhile, when a plurality of battery cells are connected in series or in parallel to configure a battery pack, it is common to configure a battery module including at least one battery cell first, and then configure a battery pack by using at least one battery module and adding other components.

In the case of a conventional battery module, an electrode lead of a battery cell and a sensing bus bar of a bus bar assembly are closely pressed by using a welding jig so that the electrode lead and the sensing bus bar are welded by laser welding or the like. When welding the electrode lead of the conventional battery cell and the sensing bus bar of the bus bar assembly, a protrusion step difference may occur between the electrode lead and the sensing bus bar due to an assembly tolerance of the bus bar assembly or the like. In the conventional battery module, if the welding process is performed in a state where the protrusion step difference occurs, welding defects may be more likely to occur.

In the conventional art, when pressing the electrode lead and the sensing bus bar using a pressing jig or the like in order to compensate for the protrusion step difference, in the conventional battery module, generally, the sensing bus bar is mounted in a state of being fixed to a bus bar frame of the bus bar assembly. Thus, the relatively movable electrode lead side is intensively pressed, which may cause a damage to the electrode lead.

Therefore, there is a demand to develop a battery module which may prevent the electrode lead from being damaged while welding and connecting an electrode lead of at least one battery cell and a sensing bus bar of the bus bar assembly and also prevent welding quality from deteriorating even if a protrusion step difference is formed due to an assembly tolerance, and also to provide a battery pack and a vehicle including the battery module.

DISCLOSURE

Technical Problem

Therefore, the present disclosure is directed to providing a battery module which may prevent an electrode lead from being damaged when an electrode lead of at least one battery cell and a sensing bus bar of a bus bar assembly are welded and connected, and a battery pack and a vehicle including the battery module.

In addition, the present disclosure is also directed to providing a battery module, which may prevent welding quality from deteriorating even if a protrusion step difference is formed due to an assembly tolerance when the electrode lead of at least one battery cell and the sensing bus bar of the bus bar assembly are welded and connected, and a battery pack and a vehicle including the battery module.

Moreover, the present disclosure is also directed to providing a battery module, which may prevent the electrode lead from being damaged when cell swelling occurs at battery cells, and a battery pack and a vehicle including the battery module.

Technical Solution

In one aspect of the present disclosure, there is provided a battery module, comprising: a plurality of battery cells having electrode leads configured to protrude on at least one side thereof; and a bus bar assembly configured to electrically connect the electrode leads of the plurality of battery cells, wherein the bus bar assembly includes: a bus bar frame configured to cover at least one side of the plurality of battery cells; a plurality of lead slots defined by the bus bar frame so that the electrode leads pass therethrough; at least one sensing bus bar disposed between the plurality of lead slots and connected to the electrode leads; and at least one elastic guider configured to elastically support the at least one sensing bus bar and disposed at the rear of the at least one sensing bus bar in a front and rear direction of the bus bar frame.

The at least one sensing bus bar may be configured to be movable along the front and rear direction of the bus bar frame while elastically contacting the at least one elastic guider.

The at least one elastic guider may include a first leaf spring coupled to the bus bar frame and configured to be elastically deformable in the front and rear direction of the bus bar frame; and a second leaf spring coupled to the bus bar frame to be spaced apart from the first leaf spring by a predetermined distance and configured to be elastically deformable in the front and rear direction of the bus bar frame.

The at least one elastic guider may include a spring connection portion provided to the bus bar frame and configured to connect the first leaf spring and the second leaf spring.

The spring connection portion may be configured to be in contact with a rear surface of the at least one sensing bus bar.

The at least one elastic guider may be formed integrally with the bus bar frame.

The bus bar assembly may include an anti-separation stopper coupled to the bus bar frame and configured to prevent the at least one sensing bus bar from being separated from the bus bar frame.

The anti-separation stopper may include a stopper hook provided above the at least one sensing bus bar and configured to limit a movement of a top end of the at least one sensing bus bar over a predetermined distance when the at least one sensing bus bar moves forward; and a stopper groove provided below the at least one sensing bus bar and configured to limit a movement of a bottom end of the at least one sensing bus bar over a predetermined distance when the at least one sensing bus bar moves forward.

In addition, the present disclosure further provides a battery pack, comprising: at least one battery module according to the above embodiments; and a pack case configured to package the at least one battery module.

Moreover, the present disclosure further provides a vehicle, comprising at least one battery pack according to the above embodiments.

Advantageous Effects

According to various embodiments as above, it is possible to provide a battery module which may prevent an electrode lead from being damaged when an electrode lead of at least one battery cell and a sensing bus bar of a bus bar assembly are welded and connected, and a battery pack and a vehicle including the battery module.

In addition, according to various embodiments as described below, it is possible to provide a battery module which may prevent welding quality from deteriorating even if a protrusion step difference is formed due to an assembly tolerance when the electrode lead of at least one battery cell and the sensing bus bar of the bus bar assembly are welded and connected, and a battery pack and a vehicle including the battery module.

Moreover, according to various embodiments as above, it is possible to provide a battery module which may prevent the electrode lead from being damaged when cell swelling occurs at battery cells, and a battery pack and a vehicle including the battery module.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
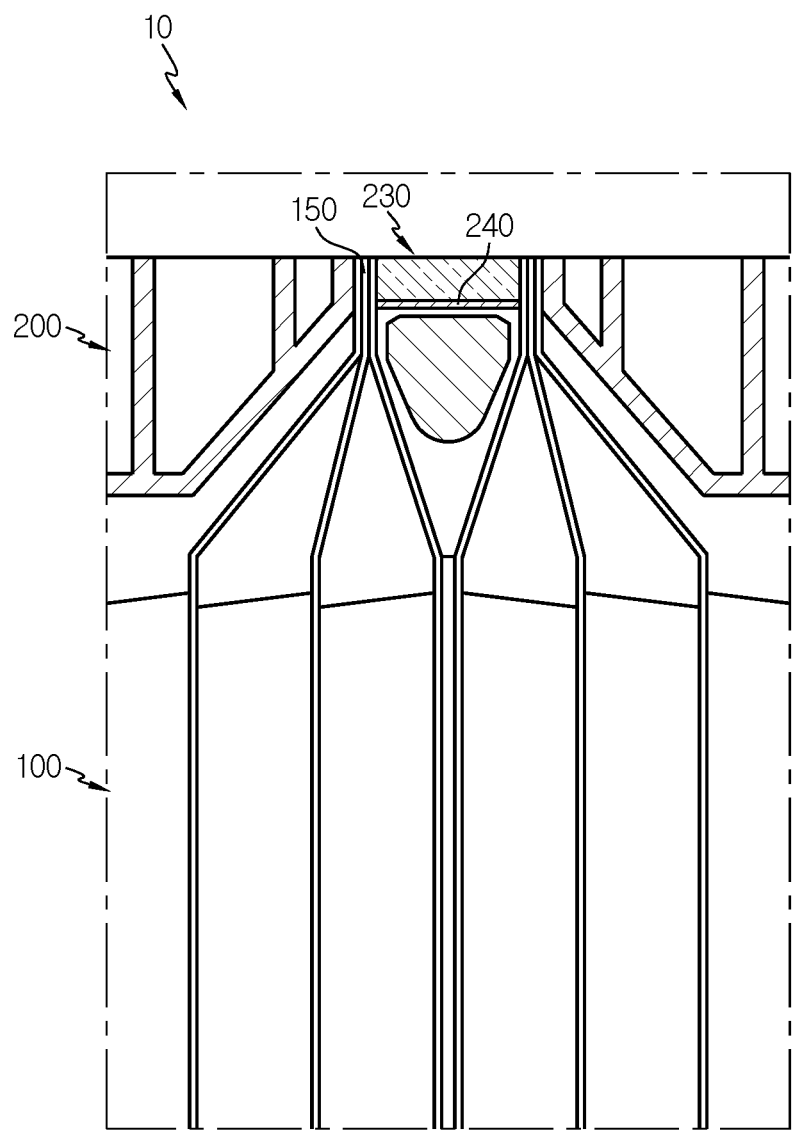
FIG. 1 is a diagram for illustrating a battery module according to an embodiment of the present disclosure.
Figure 2:
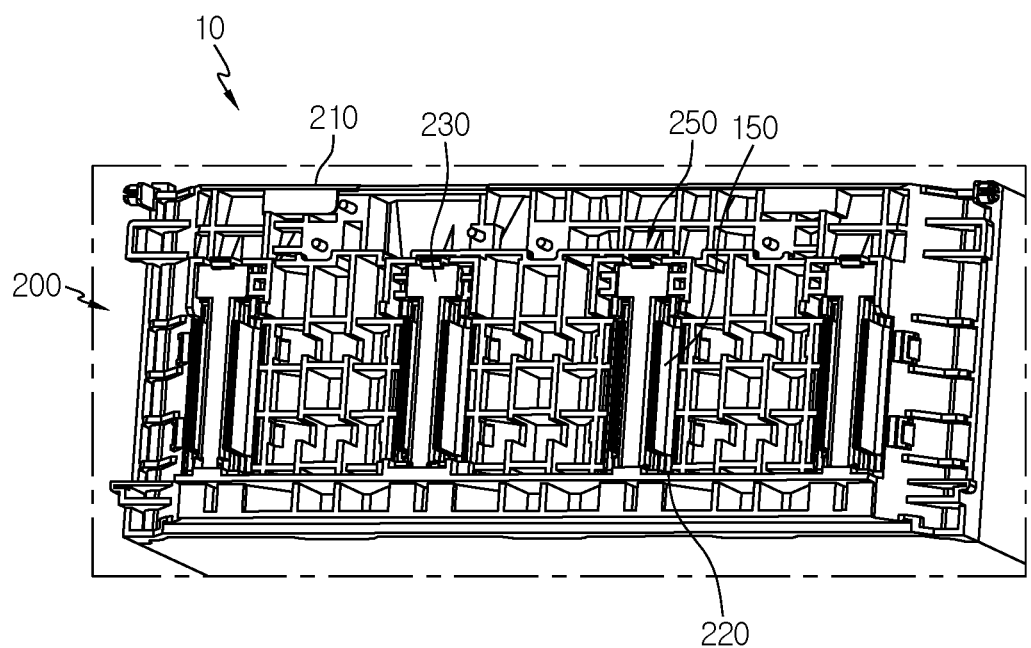
FIG. 2 is a diagram for illustrating a main part of the battery module of FIG. 1.
Figure 3:
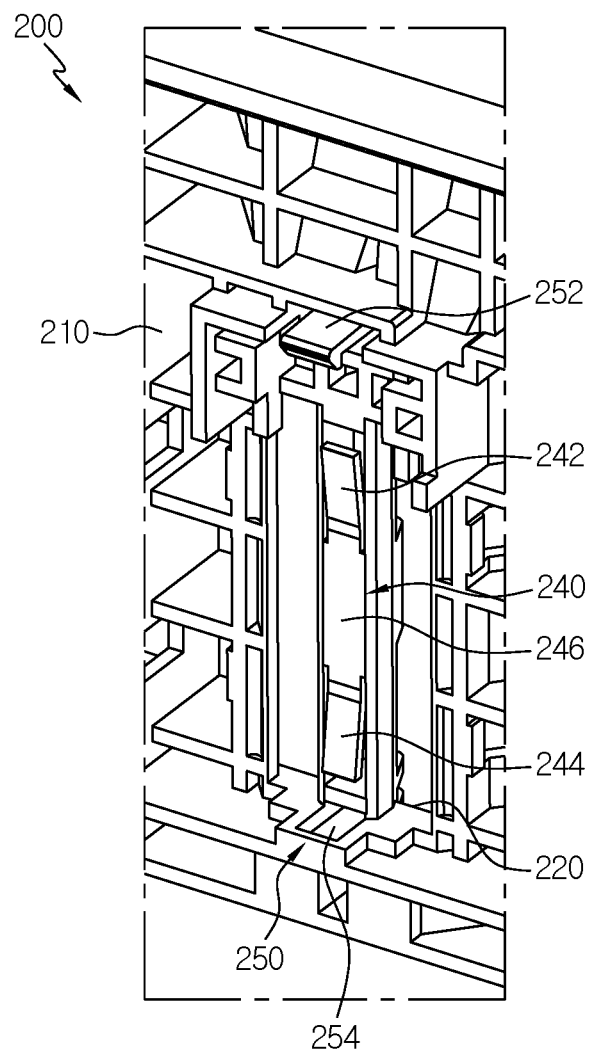
FIG. 3 is a diagram for illustrating a bus bar frame, from which a sensing bus bar of a bus bar assembly of FIG. 2 is excluded.

FIG. 1 is a diagram for illustrating a battery module according to an embodiment of the present disclosure, FIG. 2 is a diagram for illustrating a main part of the battery module of FIG. 1, and FIG. 3 is a diagram for illustrating a bus bar frame, from which a sensing bus bar of a bus bar assembly of FIG. 2 is excluded.

Referring to FIGS. 1 to 3, a battery module 10 may include a battery cell 100 and a bus bar assembly 200.

The battery cell 100 is a secondary battery and may be provided as a pouch-type secondary battery, a rectangular secondary battery or a cylindrical secondary battery. Hereinafter, in this embodiment, it will be described that the battery cell 100 is provided as a pouch-type secondary battery.

There may be a plurality of battery cells 100. The plurality of battery cells 100 are stacked to be electrically connected to each other, and electrode leads 150 may protrude on at least one side of each thereof.

The bus bar assembly 200 is provided for electrically connecting the electrode leads 150 of the plurality of battery cells 100, and may be disposed at one side of the plurality of battery cells 100.

The bus bar assembly 200 may include a bus bar frame 210, a lead slot 220, a sensing bus bar 230, an elastic guider 240, and an anti-separation stopper 250.

The bus bar frame 210 may cover at least one side of the plurality of battery cells 100. To this end, the bus bar frame 210 may be sized and shaped to cover at least one side of the plurality of battery cells 100.

The lead slot 220 is defined by the bus bar frame 210 and may allow the electrode leads 150 of the plurality of battery cells 100 to pass therethrough. There may be a plurality of lead slots 220, wherein each of the plurality of electrode leads 150 may pass through each of the plurality of lead slots 220.

The sensing bus bar 230 is disposed between the plurality of lead slots 220 and may be connected to the electrode leads 150 of the battery cells 100. There may be a plurality of sensing bus bars 230. Hereinafter, in this embodiment, it will be described that there are a plurality of sensing bus bars 230.

The plurality of sensing bus bars 230 may be passing through the lead slots 220 and connected with the electrode leads 150 of the plurality of battery cells 100 by welding such as laser welding. Here, the electrode leads 150 may be welded to the sensing bus bar 230 in a non-bending manner where the electrode leads 150 are not bent.

The elastic guider 240 may elastically support the sensing bus bar 230 and may be disposed at the rear of the sensing bus bar 230 in a front and rear directions of the bus bar frame 210.

There may be plurality of elastic guiders 240 to correspond to the number of the sensing bus bars 230. The elastic guider 240 may be formed integrally with the bus bar frame 210.

By means of the elastic guider 240, the plurality of sensing bus bars 230 may be provided to be movable along the front and rear direction of the bus bar frame 210 while elastically contacting the elastic guider 240.

The elastic guider 240 may include a first leaf spring 242, a second leaf spring 244, and a spring connection portion 246.

The first leaf spring 242 may be coupled to the bus bar frame 210. The first leaf spring 242 may be elastically deformable in the front and rear direction of the bus bar frame 210.

The second leaf spring 244 may be coupled to the bus bar frame 210 spaced apart from the first leaf spring 210 by a predetermined distance. The second leaf spring 244 may be elastically deformable in the front and rear direction of the bus bar frame 210, like the first leaf spring 242.

The spring connection portion 246 is coupled to the bus bar frame 210 and may connect the first leaf spring 242 and the second leaf spring 244. The spring connection portion 246 may be in contact with a rear surface of the sensing bus bar 230.

The anti-separation stopper 250 is coupled to the bus bar frame 210, and may prevent the sensing bus bar 230 from being separated from the bus bar frame 210 when the sensing bus bar 230 moves forward and backward.

The anti-separation stopper 250 may include a stopper hook 252 and a stopper groove 254.

The stopper hook 252 is positioned above the sensing bus bar 230 and may limit a movement of a top end of the sensing bus bar 230 over a predetermined distance when the sensing bus bar 230 moves forward.

The stopper groove 254 is positioned below the sensing bus bar 230 and may limit a movement of a bottom end of the sensing bus bar 230 over a predetermined distance when the sensing bus bar 230 moves forward.

Figure 4:
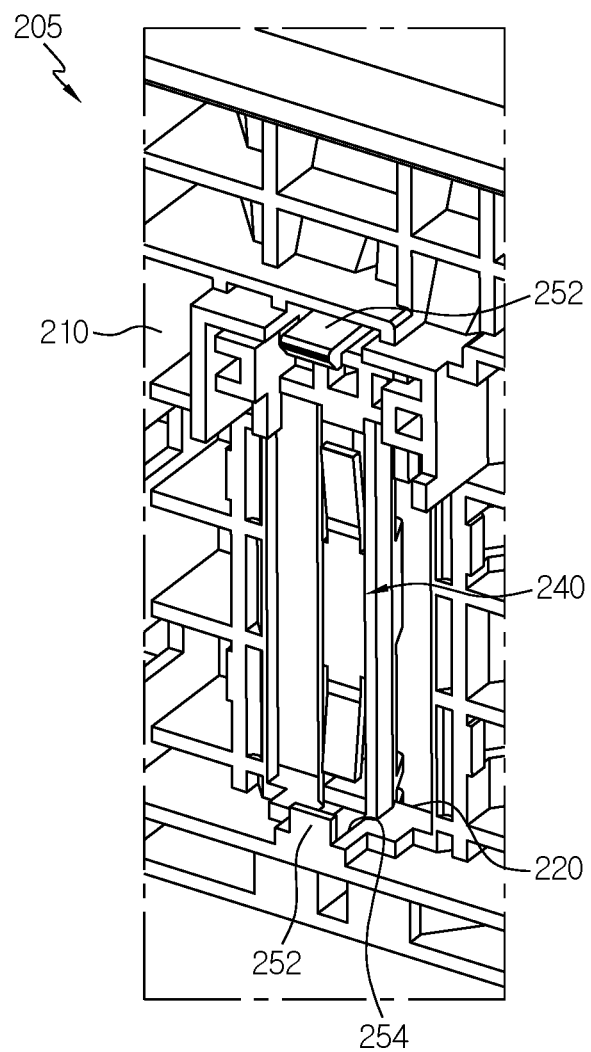
FIG. 4 is a diagram for illustrating an anti-separation stopper according to another embodiment of the present disclosure of FIG. 1.

FIG. 4 is a diagram for illustrating an anti-separation stopper according to another embodiment of the present disclosure of FIG. 1.

Referring to FIG. 4, the bus bar assembly 205 may include the stopper hook 252 in a pair. The pair of stopper hooks 252 may be positioned at upper and lower sides of the sensing bus bar 230, respectively, to more effectively prevent the sensing bus bar 230 from being separated when the sensing bus bar 230 moves forward.

Hereinafter, a detailed operation of the elastic guider 240 of the bus bar assembly 200 of the battery module 10 according to this embodiment will be described in more detail.

Figure 5:
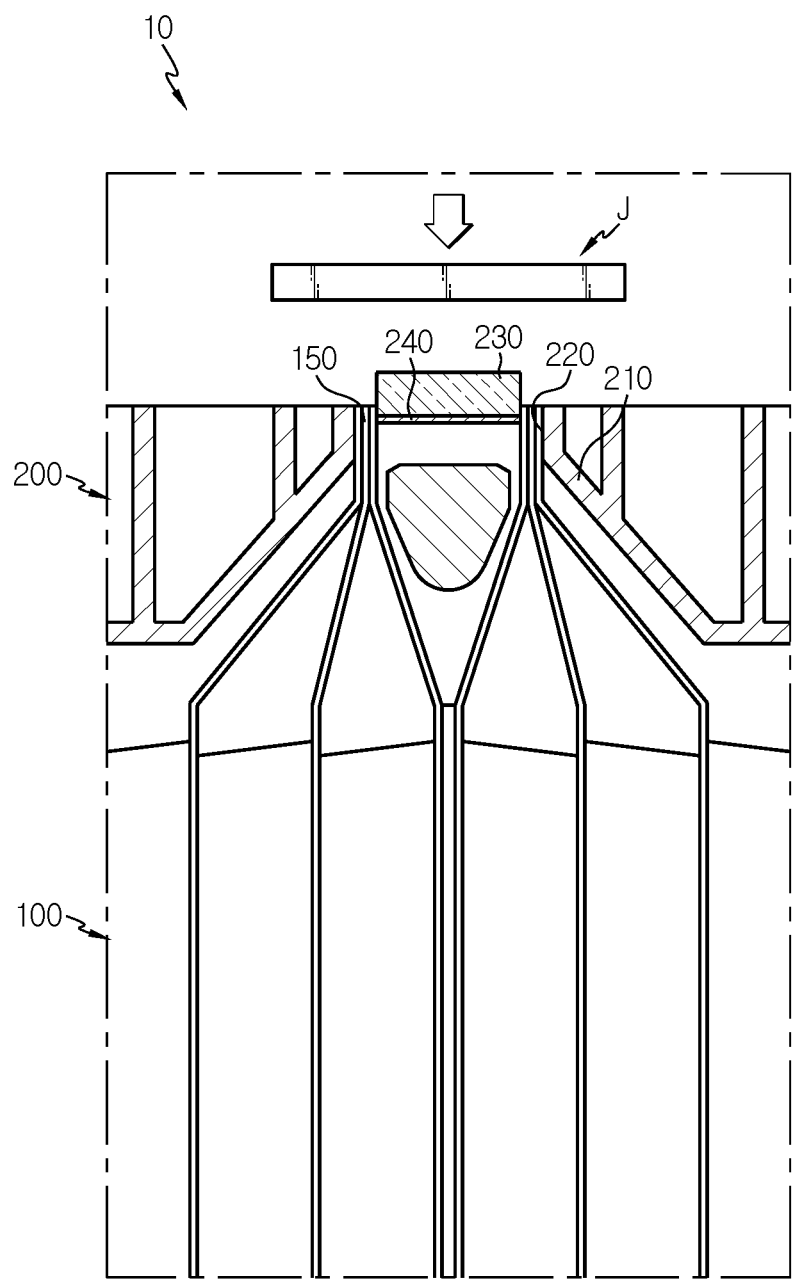
FIGS. 5 and 6 are diagrams for illustrating a step difference correction between electrode leads and a sensing bus bar using an elastic guider when the electrode leads of the battery cells of the battery module of FIG. 1 and the sensing bus bar are welded.
Figure 6:
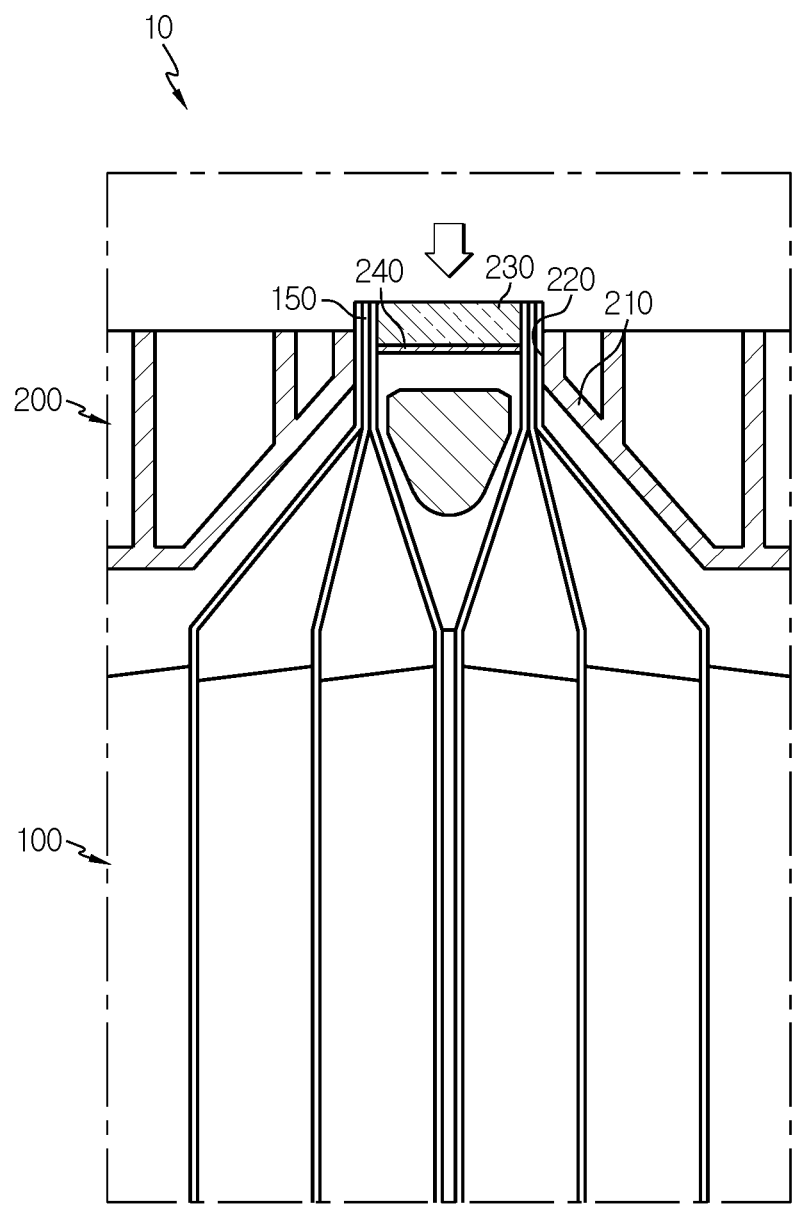

FIGS. 5 and 6 are diagrams for illustrating a step difference correction between electrode leads and a sensing bus bar using an elastic guider when the electrode leads of the battery cells of the battery module of FIG. 1 and the sensing bus bar are welded.

First, the upper and lower direction of FIGS. 5 and 6 may correspond to the front and rear direction of FIGS. 2 to 4.

That is, the upper direction of FIGS. 5 and 6 may be the front direction of FIGS. 2 to 4, and the lower direction of FIGS. 5 and 6 may be the rear direction of FIGS. 2 to 4. Hereinafter, the upper direction in FIGS. 5 and 6 will be described as a front direction, and the lower direction in FIGS. 5 and 6 will be described as a rear direction.

Referring to FIGS. 5 and 6, in the battery module 10, when the battery cells 100 and the bus bar assembly 200 are assembled, a predetermined step difference may occur between the electrode leads 150 of the battery cells 100 and the sensing bus bar 230 of the bus bar assembly 200 due to an assembly tolerance or the like.

For example, the sensing bus bar 230 of the bus bar assembly 200 may protrude forward further from the electrode leads 150 of the battery cells 100. To correct this protrusion step difference, a worker or the like may press the protruding sensing bus bar 230 downward using a pressing jig J.

In this embodiment, since the sensing bus bar 230 is elastically movable in the front and rear direction of the bus bar frame 210 by means of the elastic guider 240, when the pressing jig J is pressed downward, the bus bar frame 210 may move rearward.

After that, in order to correct the step difference between the sensing bus bar 230 and the electrode leads 150, the worker or the like may connect the electrode leads 150 and the sensing bus bar 230 to each other by welding, such as laser welding.

In this embodiment, when the pressing jig J is pressed downward, the sensing bus bar 230 is elastically movable in the front and rear direction by means of the elastic guider 240. Therefore, when the pressing jig J is pressed for correcting the step difference, a load and stress applied to the electrode leads 150 of the battery cells 100 may be minimized.

Accordingly, in this embodiment, damage to the electrode leads 150 of the battery cells 100 that may occur when correcting the step difference of the pressing jig J may be effectively prevented.

As described above, the battery module 10 according to this embodiment may prevent the electrode lead 150 from being damaged when welding and connecting the electrode lead 150 of the battery cell 100 and the sensing bus bar 230 of the bus bar assembly 200, and also may effectively prevent the welding quality from deteriorating even though a protrusion step difference occurs due to an assembly tolerance or the like.

Figure 7:
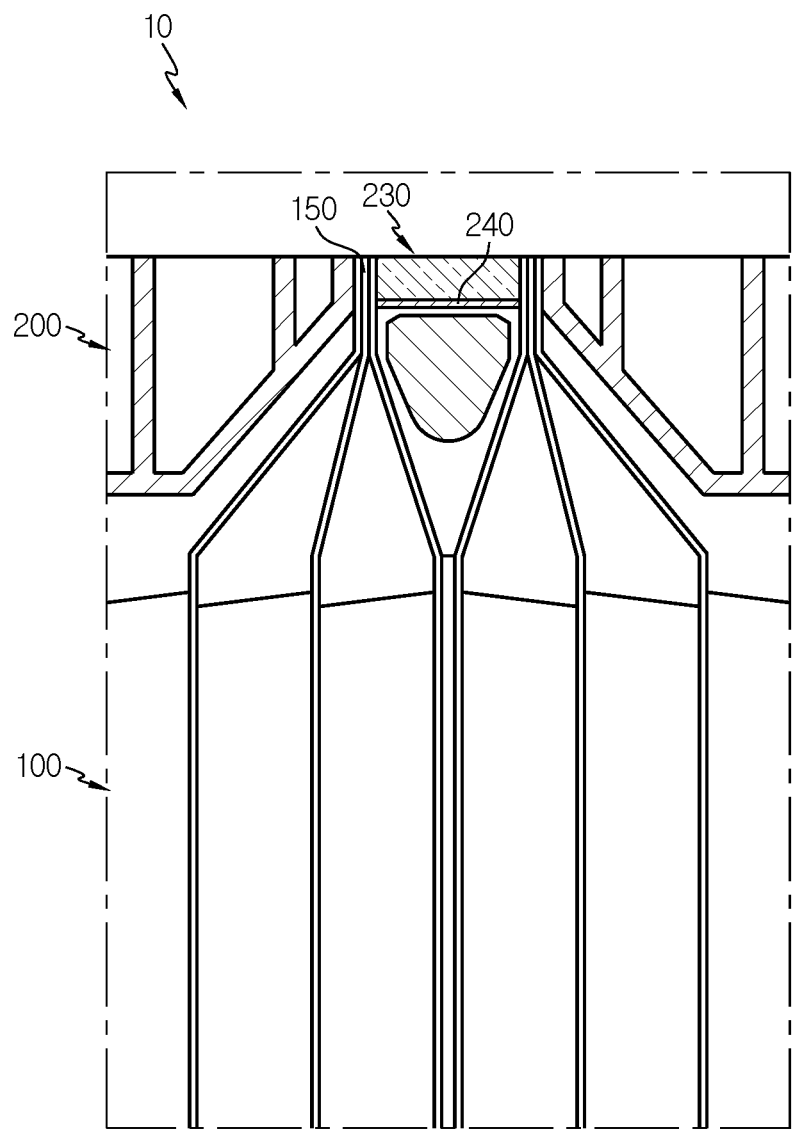
FIGS. 7 and 8 are diagrams for illustrating that the damage to the electrode lead is prevented using the elastic guider when cell swelling occurs at the battery cells of the battery module of FIG. 1.
Figure 8:
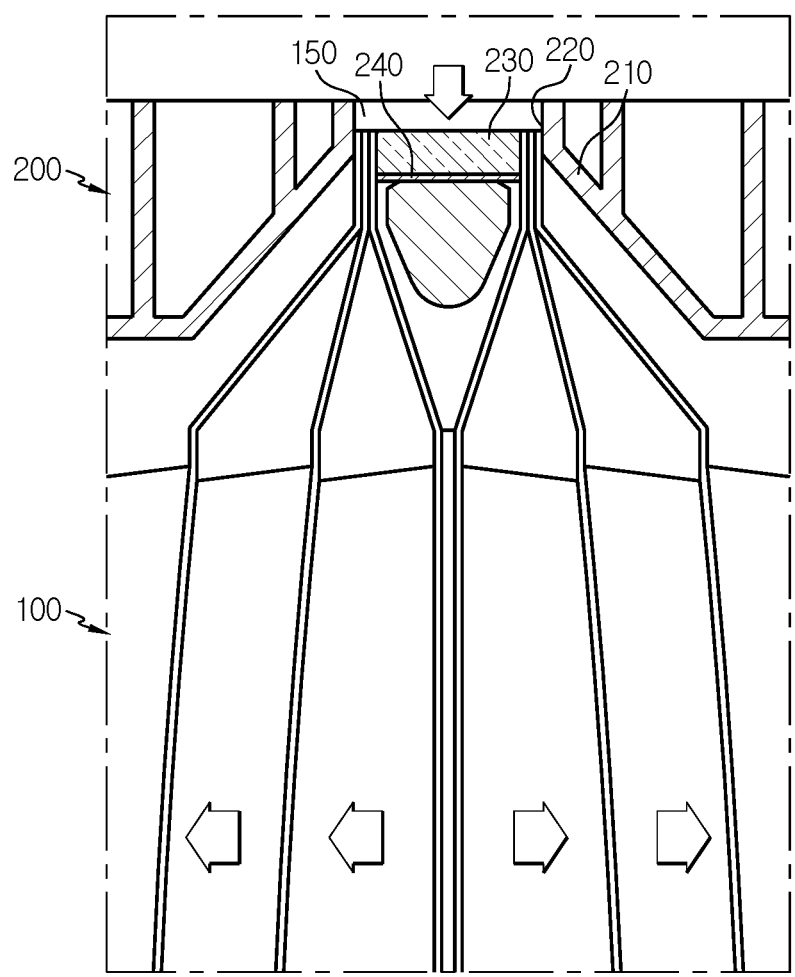

FIGS. 7 and 8 are diagrams for illustrating that the damage to the electrode lead is prevented using the elastic guider when cell swelling occurs at the battery cells of the battery module of FIG. 1.

In FIGS. 7 and 8, the upper direction will be described as a front direction and the lower direction will be described as a rear direction, like FIGS. 5 and 6.

Referring to FIGS. 7 and 8, in the battery module 10, the battery cells 100 may expand in a thickness direction due to an abnormal situation caused by overheating of the battery cells 100. That is, the battery cells 100 may expand in a left and right direction according to cell swelling.

In this embodiment, when cell swelling occurs at the battery cells 100, through the elastic guider 240, the sensing bus bar 230 and the ends of the electrode leads 150 welded to the sensing bus bar 230 may move elastically rearward (in a lower direction in FIG. 8).

As the sensing bus bar 230 and the ends of the electrode leads 150 welded to the sensing bus bar 230 move backward, the length of the electrode leads 150 tending to increase due to cell swelling of the battery cells 100 may be compensated.

Therefore, when cell swelling occurs in the battery cells 100, the battery module 10 according to this embodiment may minimize a tensile stress applied to the electrode leads 150 to effectively prevent the electrode leads 150 from being damaged due to the tensile stress.

Figure 9:
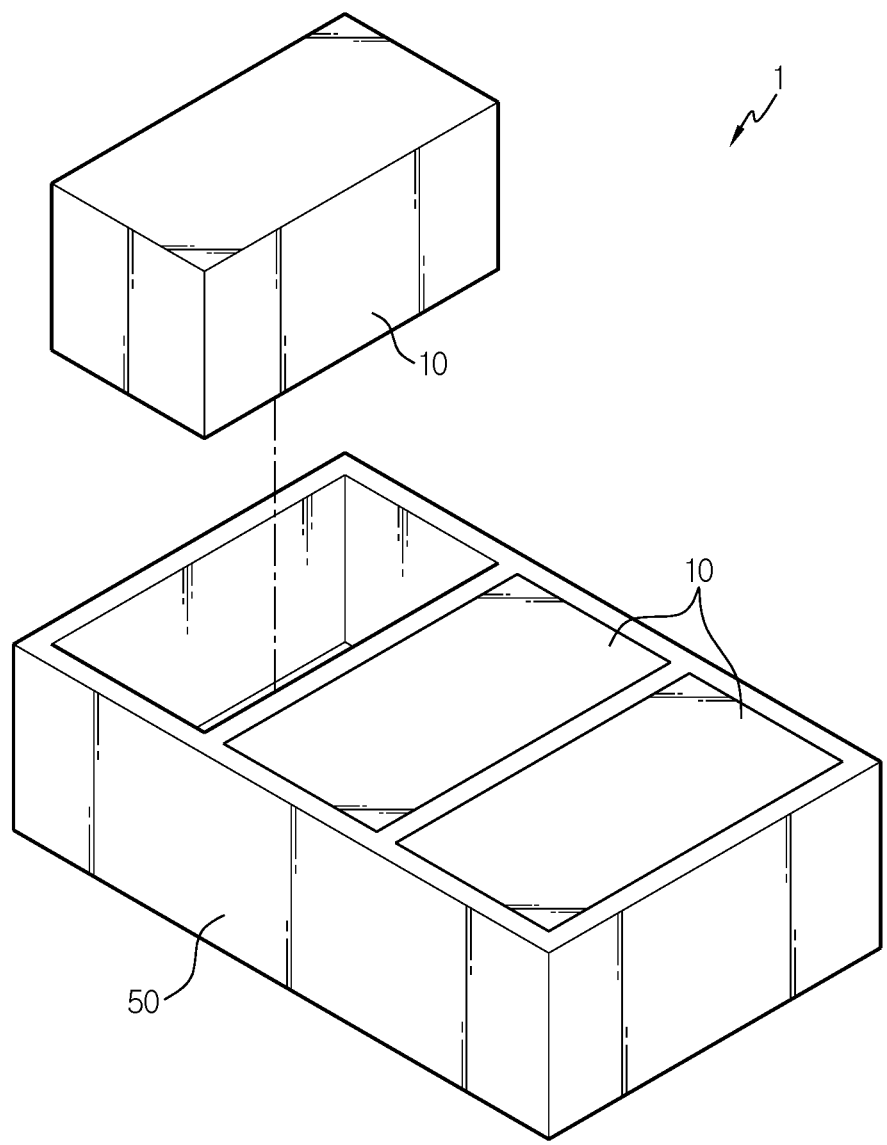
FIG. 9 is a diagram for illustrating a battery pack according to an embodiment of the present disclosure.
Figure 10:
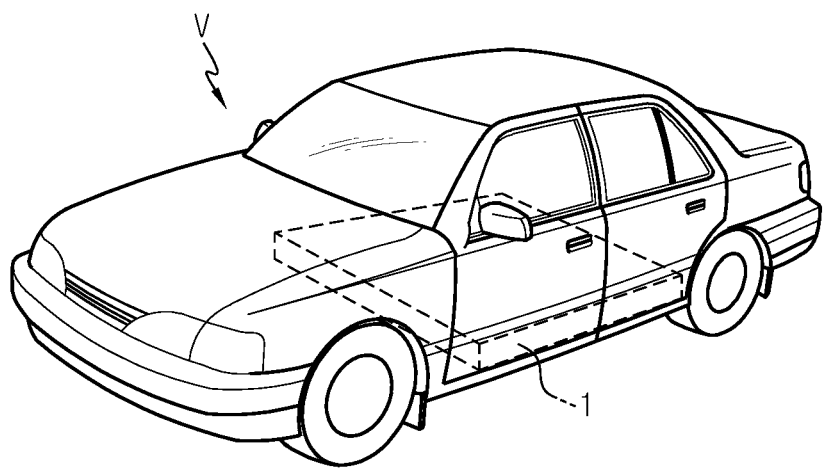
FIG. 10 is a diagram for illustrating a vehicle according to an embodiment of the present disclosure.

FIG. 9 is a diagram for illustrating a battery pack according to an embodiment of the present disclosure, and FIG. 10 is a diagram for illustrating a vehicle according to an embodiment of the present disclosure.

Referring to FIGS. 9 and 10, a battery pack 1 may include at least one battery module 10 and a pack case 50 for packaging the at least one battery module 10 according to the above-described embodiment.

The battery pack 1 may be provided to a vehicle V as a fuel source of the vehicle. As an example, the battery pack 1 may be provided to an electric vehicle, a hybrid electric vehicle, and various other-type vehicles V capable of using the battery pack 1 as a fuel source.

In addition, the battery pack 1 may be provided in other devices, instruments or facilities such as an energy storage system using a secondary battery, in addition to the vehicle V.

As described above, the battery pack 1 of this embodiment and devices, instruments or facilities such as the vehicle, which have the battery pack 1, include the battery module 10 as described above, and thus it is possible to implement a battery pack 1 having all the advantages of the battery module 10 described above, or devices, instruments, facilities or the like such as the vehicle V, which have the battery pack 1.

According to various embodiments as above, it is possible to provide a battery module 10 which may prevent an electrode lead 150 from being damaged when an electrode lead 150 of at least one battery cell 100 and a sensing bus bar 230 of a bus bar assembly 200, 205 are welded and connected, and a battery pack 1 and a vehicle V including the battery module 10.

In addition, according to various embodiments as described above, it is possible to provide a battery module 10, which may prevent welding quality from deteriorating even if a protrusion step difference is formed due to an assembly tolerance when the electrode lead 150 of at least one battery cell 100 and the sensing bus bar 230 of the bus bar assembly 200, 205 are welded and connected, and a battery pack 1 and a vehicle V including the battery module 10.

Moreover, according to various embodiments as described above, it is possible to provide a battery module 10, which may prevent the electrode lead 150 from being damaged when cell swelling occurs at battery cells 100, and a battery pack 1 and a vehicle V including the battery module 10.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery module, comprising:
a plurality of battery cells having electrode leads configured to protrude on at least one side of each of the plurality of battery cells; and
a bus bar assembly configured to electrically connect the electrode leads of the plurality of battery cells,
wherein the bus bar assembly includes:
a bus bar frame configured to cover at least one side of each of the plurality of battery cells;
a plurality of lead slots defined by the bus bar frame sized and shaped for the electrode leads to pass therethrough;
at least one sensing bus bar disposed within each of the plurality of lead slots and connected to the electrode leads; and
at least one elastic guider configured to elastically support the at least one sensing bus bar, wherein first and second opposing directions are defined with respect to the bus bar frame and the elastic guider is positioned in the second direction relative to the at least one sensing bus bar.

2. The battery module according to claim 1,
wherein the at least one sensing bus bar is configured to be movable along the first and second directions of the bus bar frame while elastically contacting the at least one elastic guider.

3. The battery module according to claim 2,
wherein the at least one elastic guider includes:
a first leaf spring coupled to the bus bar frame and configured to be elastically deformable in the first and second directions of the bus bar frame; and
a second leaf spring coupled to the bus bar frame spaced apart from the first leaf spring by a predetermined distance and configured to be elastically deformable in the first and second directions of the bus bar frame.

4. The battery module according to claim 3,
wherein the at least one elastic guider includes a spring connection portion coupled to the bus bar frame and configured to connect the first leaf spring and the second leaf spring.

5. The battery module according to claim 4,
wherein the spring connection portion is configured to be in contact with a surface of the at least one sensing bus bar.

6. The battery module according to claim 2,
wherein the at least one elastic guider is formed integrally with the bus bar frame.

7. The battery module according to claim 2,
wherein the bus bar assembly includes an anti-separation stopper coupled to the bus bar frame and configured to prevent the at least one sensing bus bar from being separated from the bus bar frame.

8. The battery module according to claim 7,
wherein the anti-separation stopper includes:
a stopper hook positioned above the at least one sensing bus bar and configured to limit a movement of a first end of the at least one sensing bus bar over a predetermined distance when the at least one sensing bus bar moves in the first direction; and
a stopper groove provided below the at least one sensing bus bar and configured to limit a movement of a second end opposite the first end of the at least one sensing bus bar over a predetermined distance when the at least one sensing bus bar moves in the first direction.

9. A battery pack, comprising:
at least one battery module as defined in claim 1; and
a pack case configured to package the at least one battery module.

10. A vehicle, comprising:
at least one battery pack as defined in claim 9.

* * * * *